(12) United States Patent
Bi et al.

(10) Patent No.: US 11,962,150 B1
(45) Date of Patent: Apr. 16, 2024

(54) SYSTEM AND METHOD OF PROTECTING POWER SYSTEM HAVING INVERTER-INTERFACED RENEWABLE ENERGY SOURCES

(71) Applicant: NORTH CHINA ELECTRIC POWER UNIVERSITY, Beijing (CN)

(72) Inventors: Tianshu Bi, Beijing (CN); Ke Jia, Beijing (CN); Qian Liu, Beijing (CN); Hao Liu, Beijing (CN); Cheng Wang, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/203,488

(22) Filed: May 30, 2023

(51) Int. Cl.
*H02J 3/00* (2006.01)
*H02M 7/537* (2006.01)
*H02M 7/5395* (2006.01)

(52) U.S. Cl.
CPC ........... *H02J 3/0012* (2020.01); *H02M 7/537* (2013.01); *H02M 7/5395* (2013.01)

(58) Field of Classification Search
None
See application file for complete search history.

(56) References Cited

U.S. PATENT DOCUMENTS 10,879,785 B2 * 12/2020 Shuai ................. H02M 7/5387
2023/0155473 A1 * 5/2023 Hernandez Manchola ................
H02J 3/0012
323/304

FOREIGN PATENT DOCUMENTS

CN 104333244 A * 2/2015 ............... H02J 3/26

* cited by examiner

*Primary Examiner* — Thomas C Lee
*Assistant Examiner* — Anzuman Sharmin
(74) *Attorney, Agent, or Firm* — Hunton Andrews Kurth LLP (57) ABSTRACT

A method for protecting a power system having inverter-interfaced renewable energy sources is provided. The power system includes an inverter and a control system. The control system includes a current controller including a saturation limiter and a proportional and integral (PI) controller, a phase-locked system, and a low-voltage ride-through (LVRT)control unit. The method includes: by using a Park transformation matrix, determining an output voltage of the inverter; determining a modulated voltage of the output voltage; upon detecting a grid fault, obtaining current references by the LVRT control unit; determining a fault current in a first stage of a transient phase of the grid fault; determining a fault current in a second stage of the transient phase; determining a fault current in a third stage of the transient phase; and switching the control system to a fault control mode by tracking the fault currents in the first, second and third stages, to the current references.

1 Claim, 9 Drawing Sheets

SYSTEM AND METHOD OF PROTECTING POWER SYSTEM HAVING INVERTER-INTERFACED RENEWABLE ENERGY SOURCES

FIELD OF THE INVENTION

The present disclosure relates generally to renewable energy power systems, and more particularly, to systems and methods of protecting power systems having inverter-interfaced renewable energy sources.

BACKGROUND

Existing power system protections are designed based on the fault characteristics and analytical short-circuit models of synchronous generators. In accordance with the criteria established by the analytical models, protections can correctly distinguish the short-circuit faults. In the presence of inverter-interfaced renewable energy sources (IIRESs), the electrical current limiting and distortion characteristics of IIRESs deteriorate the performance of existing protection schemes. Therefore, it is necessary to provide accurate analytical fault analysis models of IIRESs to support the design principle of protection.

Generally, electromagnetic transient (EMT) models can precisely emulate fault behaviors of IIRESs, but the computation may be costly and time-consuming. To tackle this problem, phasor models (PMs) are accordingly developed. Nevertheless, EMT models and PMs are still the simulation models, which can hardly exhaust all fault scenarios and conditions. Thus, these models are difficult to reveal the analytical mechanism of fault responses of IIRESs. This hinders the comprehensive analysis of IIRESs' impacts on existing protections and design of novel protections.

SUMMARY

Aspects of the disclosed technology include systems and methods of protecting power systems having inverter-interfaced renewable energy sources.

Embodiments of the present disclosure provide a method for protecting a power system having inverter-interfaced renewable energy sources (IIRESs). The power system includes an inverter, an inductor-capacitor-inductor (LCL) limiter, a control system, and at least one renewable energy source; and the control system includes a current controller including a saturation limiter and a proportional and integral (PI) controller, a phase-locked system, and a low-voltage ride-through (LVRT)control unit. The method includes: by using a Park transformation matrix, determining an output voltage of the inverter; determining a modulated voltage of the output voltage; upon detecting a grid fault, obtaining current references by the LVRT control unit; determining a fault current in a first stage of a transient phase of the grid fault; determining a fault current in a second stage of the transient phase of the grid fault; determining a fault current in a third stage of the transient phase of the grid fault; and switching the control system to a fault control mode by tracking the fault currents in the first stage, second stage and third stage of the transient phase of the grid fault, to the current references obtained by LVRT unit; evaluating an effectiveness of a power frequency line protection of the power system, and designing control loops of the IIRESs to improve performance of power frequency line protection.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention. The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

I. Introduction

Different from the conventional synchronous generators, there is no recognized analytical fault model for IIRESs because of the complex control systems. IIRESs can be modeled as ideal current or voltage sources during a short-circuit fault. However, these types of models are mainly applicable to the steady-state analysis of IIRESs, not satisfied to support the transient analysis.

To capture the transient phase, control responses of IIRESs need to be fully considered. On basis of a typical IIRES's fault control mode, analytical models of IIRESs can be derived from the control unit using the second-order dynamic equations in a synchronous reference frame (SRF). The other alternative way is to combine control parameters with a curve fitting method to analyze fault currents of IIRESs. Even though these methods can reveal the transient attenuation process of the fault current, their analytical results are merely yielded from the ideal control loops of IIRESs. Influencing factors of dynamic characteristics of the control system (DCCS) such as the controller saturation, and phase-locked loop (PLL) dynamics are simply ignored. Thus, they are limited to the analysis of IIRESs with an ideal operating control system. Whereas, control responses of IIRESs during a grid fault are usually complex and nonlinear in practice.

During the low-voltage ride-through (LVRT) period, fault characteristics of IIRESs are closely related to the current controller and phase-locked system. The controller saturation and PLL dynamics are critical determinants resulting in the undesirable responses of the control system. Hence, these two important factors of DCCS need to be sufficiently considered in the analytical models of IIRESs. Researches has been conducted focusing on the first factor (i.e., the controller saturation) and analytical models of IIRESs have been proposed to analyze influences of the saturation elements on the fault current characteristics. However, considerations of PLL dynamics and interactions among different factors of DCCS are still missing in the aforementioned researches. Therefore, it requires to establish an accurate analytical model of IIRESs that fully considers DCCS. On the one hand, root impacts of IIRESs on the traditional protection schemes can be elaborated using the analytical method disclosed herein. On the other hand, the improved traditional protections and novel principles of protections can be exploited based on the general characteristics of the intuitive analytical results.

Motivated by the above targets, the fault model of the IIRES is proposed to analyze impacts of the saturation elements. As a further attempt to accurately characterize fault behaviors influenced by various factors of DCCS, the present disclosure discloses a generic analytical fault model of IIRESs with DCCS comprehensively taken into account. Thus, the generality of the disclosed model can be significantly extended to multiple scenarios including cases affected by a single factor of DCCS and those under impacts of multi-factors of DCCS. Advantages of the present disclosure can include, but are not limited to, 1) the disclosed method can provide the unified mathematical treatments underlying the fault characteristics of IIRESs influenced by DCCS, expanding the fault analysis models of IIRESs; 2) the delay factors attributed to the controller saturation, PLL dynamics and their interactions are covered in this model, which enables detailed analysis of the transient response; and 3) the disclosed method provides an accurate and generic analytical fault model of IIRESs with a maximum calculation error less than 10%, and thus can support the improvement and design of protections for power systems.

Specifically, the accurate analytical fault analysis model of the emerging inverter-interfaced renewable energy sources (IIRESs) is an important basis for protection of power systems with RESs. However, factors of dynamic characteristics of the control system (DCCS) such as the controller saturation and phase-locked loop (PLL) dynamics have rarely been simultaneously studied in the existing analytical models of IIRESs. As a result, the accurate analytical models can hardly be guaranteed. To address this issue, the present disclosure discloses an analytical model for IIRESs taking DCCS into account to characterize the complex fault responses of IIRESs. Both the controller saturation and PLL dynamics are considered in the transient and steady-state phases to investigate the fault current characteristics. On this basis, the analytical fault current formulations under the influences of DCCS are yielded using a piecewise linearization method. Field short-circuit and simulation tests indicate that the disclosed model is applicable to various fault conditions and its calculation accuracy can be improved by at most 55% in comparison with the existing IIRESs' analytical models.

In the present disclosure, basic mathematical models of IIRESs are discussed in Section II, and then, main factors of DCCS are introduced, such as the LVRT control strategy, controller saturation and PLL dynamics. In Section III, these factors are further taken into consideration to derive the analytical fault model of the IIRES. To validate the performance of the disclosed model, simulations and field tests are respectively shown in Section IV and Section V. Finally, Section VI provides conclusions.

II. Inverter-Interfaced Renewable Energy Source

A. Basic Mathematical Models of the IIRES

Figure 1:
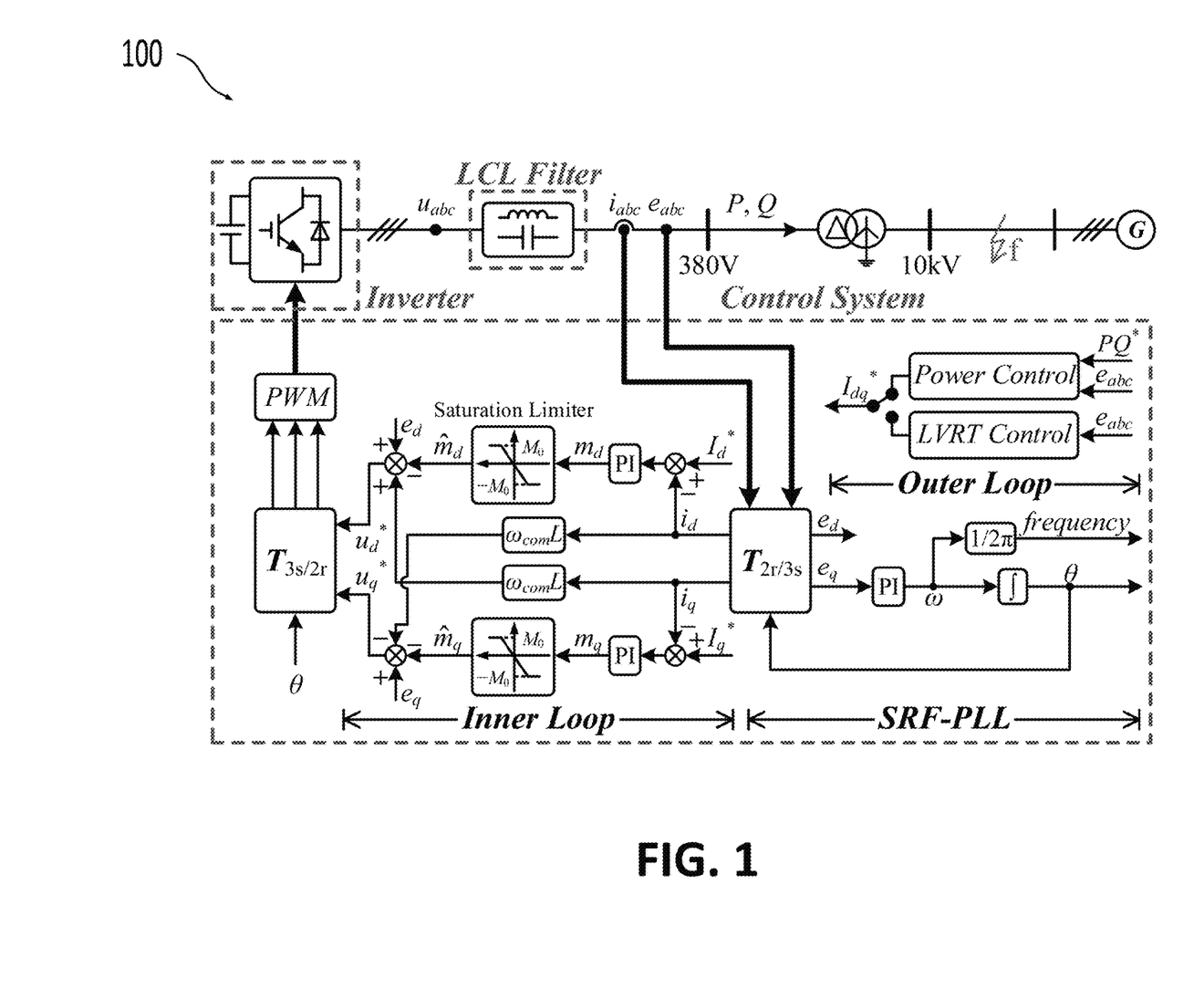
FIG. 1 illustrates a diagram of a typical integrated system and a control scheme/system of an IIRES according to an embodiment of the present disclosure.

FIG. 1 illustrates a diagram 100 of a typical integrated system and a control scheme/system of an IIRES according to an embodiment of the present disclosure. As shown in the diagram 100, for an inductor-capacitor-inductor (LCL) power filter used in the integrated system, the influence of the capacitor branch can be neglected when analyzing the fundamental component of a fault current. By using a Park transformation matrix $T_{2r/3s}$, equations of the inverter output voltage $u_\varphi$ in the dq-coordinate system are given by $$\begin{cases} u_d = -L\dfrac{di_d}{dt} - Ri_d + \omega Li_q + e_d \\ u_q = -L\dfrac{di_q}{dt} - Ri_q - \omega Li_d + e_q \end{cases} \quad (1)$$

Where $\omega$ is the angular frequency detected by the SRF-PLL, $e_\varphi$ is the terminal voltage and $i_\varphi$ the grid current. Here $\varphi \in \{a, b, c\}$ or $\varphi \in \{d, q\}$, depending on the adopted reference frame. R and L are the total resistance and inductance of the power filter.

Based on the control system/scheme presented in FIG. 1, the modulated voltage $u_\varphi^*$ satisfies the following relationship.

$$\begin{cases} u_d^* = -\hat{m}_d + \omega_{com}Li_q + e_d \\ u_q^* = -\hat{m}_q - \omega_{com}Li_d + e_q \end{cases} \quad (2)$$

Where $\omega_{com}$ is the angular frequency of the compensation link and $\hat{m}_\varphi$ is the output of the saturation limiter.

The tuning rules of the proportional gain $k_p$ and integral gain $k_i$ are set to track the current reference inputs $I_d^*$ and $I_q^*$ with a sufficiently high accuracy. The basic IIRES's mathematical models of the actual circuit topology and the control system are respectively presented in the equation (1) and the equation (2), where $u_\varphi \approx u_\varphi^*$.

B. Different Influencing Factors of DCCS

1) Low-voltage Ride-through Control: To meet the requirements that IIRESs should remain connected to the network and inject reactive currents into the power system after a grid fault, the outer control loop of IIRESs is usually switched off after fault occurrence. By then, the current references are directly obtained from the LVRT control unit, and can be expressed as follows.

$$\begin{cases} I_d^* \leq \min\left\{\sqrt{I_{max}^2 - I_q^{*2}}, \frac{2P_0}{3e_d}I_{rated}\right\} \\ I_d^* \geq 1.5(0.9 - E^{pos})I_{rated} \end{cases} \quad (3)$$

Where $I_{max}$ is the maximal value of the fault current, $P_0$ is the pre-fault active power, $E^{pos}$ is the per-unit value of the positive sequence component of e. In the present disclosure, $I_{max}=1.2I_{rated}$ (rated current).

2) Saturation of the Current Controller: To prevent the occurrence of the overshoot phenomenon, the proportional and integral (PI) controller of the current loop introduces saturation elements into the current tracking process. Thus, the effect of the controller saturation needs to be considered in the analytical models of IIRESs. Operating states of the current controller depend on the mathematic relations between the PI controller's output $m_\varphi$ and saturation limit $M_0$ as follows.

$$\hat{m}_\varphi(t) = \begin{cases} k_p(I_\varphi^* - i_\varphi) + k_i \int (I_\varphi^* - i_\varphi)dt, & |m_\varphi| < M_0 \\ +M_0 \text{ or } -M_0, & |m_\varphi| \geq M_0 \end{cases} \quad (4)$$

Due to the piecewise characteristics of the current controller when considering saturation elements, the control system alters into a nonlinear system in the transient phase, complicating the fault analysis of IIRESs.

3) Dynamic Characteristics of the PLL: During the fault period, the time-domain expression of w can be approximately derived from the second-order control response of the SRF-PLL as shown in an equation (5), which decays exponentially. However, $\omega_{com}$ is normally set to the power angular frequency $\omega_0$ in practice. Thus, there is an error $\Delta\omega$ between $\omega$ and $\omega_{com}$ in the transient phase. As a result, the dq-axis current control loops demonstrate coupling characteristics in the transient phase, which also results in the nonlinearity of the control system.

$$\omega(t) = \omega_0 + \Delta\theta\left[-\frac{\rho_1^2}{2\lambda}e^{-\rho_1 t} + \frac{\rho_2^2}{2\lambda}e^{-\rho_2 t}\right] \quad (5)$$

Where $\Delta\theta$ is the phase jump value of e, and coefficients $\lambda$, $\rho_1$ and $\rho_2$ depend on the PI parameters of the PLL and e.

III. Analytical Model of the IIRES Considering DCCS

A. Detailed Analytical Model of the IIRES

The aforementioned factors of DCCS in Section II are taken into account in the subsequent analysis to deduce the analytical results of fault currents of the IIRES.

By substituting the equation (5) into the equation (1) and further combing the results with the equation (2), a set of differential equations containing $\Delta\omega=\omega_{com}-\omega(t)$ can be yielded. Since there are exponential terms in $\omega(t)$ in the transient phase caused by PLL dynamics, these differential equations are nonlinear. However, there is no universal analytical method to solve the nonlinear differential equations. Therefore, it is first assumed that $\Delta\omega$ is a nonzero constant during the transient response, i.e., there is only a static error between $\omega_{com}$ and $\omega(t)$ in the transient phase. In the case of a time-varying $\Delta\omega$, it is discussed in Section III. B of the present disclosure.

Based on the above assumption, the controller saturation can be further studied. The scenario that the saturation exists in both the d-axis and q-axis current controllers is taken as an example for the subsequent analysis (other cases can be similarly analyzed). In this case, the dq-axis controllers' outputs instantly exceed the saturation limit after fault occurrence, and the dq-axis controllers enter the saturation operating state. Then, due to the proceeding of current tracking process, the dq-axis controllers' outputs begin to decrease and the d-axis (or q-axis) controller will first exit from the saturation operating state. This transition process is defined as the first stage of the transient phase. Afterwards, there is only one of the dq-axis controllers working in the saturation operating state, and the IIRES is in the second stage of the transient phase. When both the d-axis and q-axis controllers exit from the saturation operating state, the control response will gradually transit to the fault steady state, and this period is defined as the third stage of the transient phase. Since $\Delta\omega$ is assumed to be a nonzero constant, PLL dynamics persistently influence the above three stages.

Figure 2:
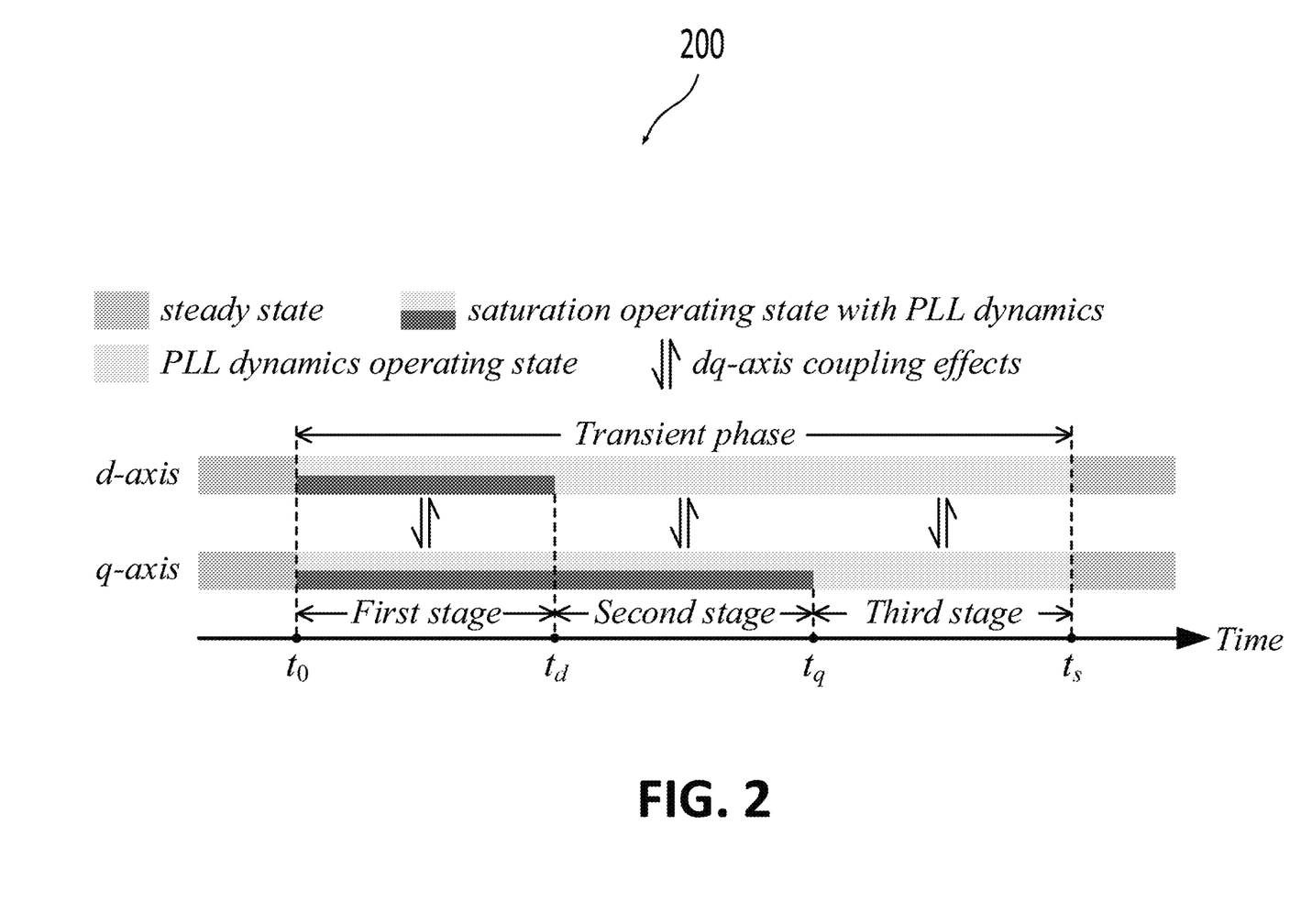
FIG. 2 illustrates a schematic diagram of different fault stages of an IIRES according to an embodiment of the present disclosure.

FIG. 2 shows a schematic diagram 200 of different fault stages of an IIRES according to an embodiment of the present disclosure. The schematic diagram 200 of the above fault transition process is presented in FIG. 2, where to is the fault time, $t_\varphi$ is the moment when the $\varphi$-axis current controller exits from the saturation operating state, $t_s$ is the end time of the transient phase, and $t_d < t_q$ is taken as an example. Note that the coupling effects in FIG. 2 differ with different stages. The analytical model of the IIRES considering DCCS will then be established based on different fault stages.

1) First Stage of the Transient Phase: Since $\omega_{com}-\omega(t)=\Delta\omega \neq 0$, the dq-axis currents become coupled after fault occurrence (labeled as "$-\Delta\omega L i_q$" and "$\Delta\omega L i_d$" in the equation (6). Besides, because both the d-axis and q-axis current controllers enter the saturation operating state at $t_0$, $\hat{m}_\varphi$ has to be numerically equal to the saturation limit (labeled as "$\pm M_0$" in the equation (6), i.e., $\hat{m}_d=M_0$ or $-M_0$, $\hat{m}_q=M_0$ or $-M_0$ in the first stage of the transient phase. Thus, combing the equations (1) and (2) yields the equation (6).

$$\begin{cases} L\frac{di_d}{dt} + Ri_d = -\Delta\omega L i_q \pm M_0 \\ L\frac{di_q}{dt} + Ri_q = \Delta\omega L i_d \pm M_0 \end{cases} \quad (6)$$

The solution of the equation (6) can be obtained as follows.

$$\begin{cases} i_d(t) = C_1 e^{-\frac{1}{\tau_1}t}\cos(\Delta\omega t) - C_2 e^{-\frac{1}{\tau_1}t}\sin(\Delta\omega t) + C_3 \\ i_q(t) = C_1 e^{-\frac{1}{\tau_1}t}\sin(\Delta\omega t) + C_2 e^{-\frac{1}{\tau_1}t}\cos(\Delta\omega t) + C_4 \end{cases}, t_0 \leq t \leq t_d \quad (7)$$

Where $C_1$-$C_4$ are constant coefficients derived from the initial current values and relevant derivative values at $t_0$. $C_3$ and $C_4$ are related to variant factors: $M_0$, R, L and $\Delta\omega$. $1/\tau_1$=R/L.

It can be observed from the equation (7) that there are damped oscillation terms in $i_d(t)$ and $i_q(t)$. Thereinto, the decay time constant depends on R and L, the oscillating period is only related to $\Delta\omega$, and the amplitude is mainly affected by $C_1$ and $C_2$. $C_3$ and $C_4$ are the forced components in the dq plane.

2) Second Stage of the Transient Phase: According to FIG. 2, the q-axis saturation limiter remains working while the d-axis controller exits from the saturation operating state at $t_d$, i.e., $\hat{m}_d=k_p(I_d^*-i_d)+k_i\int(I_d^*-i_d)dt$, and $\hat{m}_q=M_0$ or $-M_0$ in the second stage of the transient phase. Meanwhile, $\Delta\omega$ keeps unchanged. Similarly, the equations (1) and (2) can give an equation (8) as follows.

$$\begin{cases} L\dfrac{di_d}{dt} + Ri_d = -\Delta\omega L i_q + k_p(I_d^* - i_d) + k_i \int (I_d^* - i_d)dt \\ L\dfrac{di_q}{dt} + Ri_q = \Delta\omega L i_d \pm M_0 \end{cases} \quad (8)$$

It is not easy to directly deduce the equation (8) because of the integral term, but the equation can be simplified by disregarding the integral term for the following reasons. First, the setting of $k_p$ is to obtain the anticipative transient response, whereas, $k_i$ is merely used to eliminate the steady-state errors attributed to the imperfect decoupling terms. Second, $k_i$ negligibly contributes to the tracking performance of the current command. On basis of this simplification, the fault current can be derived from the equation (8) as follows.

$$\begin{cases} i_d(t) = C_5 e^{-\frac{1}{\tau_2}t} + C_6 e^{-\frac{1}{\tau_3}t} + C_7 \\ i_q(t) = C_8 e^{-\frac{1}{\tau_2}t} + C_9 e^{-\frac{1}{\tau_3}t} + C_{10} \end{cases}, t_d \le t \le t_q \quad (9)$$

Where $C_5$-$C_{10}$ can be derived from the q-axis current and its derivatives at moment $t_d$. $1/\tau_2=\{2R+k_p+[k_p^2-(2\Delta\omega L)^2]^{1/2}\}/(2L)$ and $1/\tau_3=\{2R+k_p-[k_p^2-(2\Delta\omega L)^2]^{1/2}\}/(2L)$.

Compared with the equation (7), $i_d(t)$ and $i_q(t)$ in the equation (9) no longer have the damping oscillation property, but only present the attenuation characteristics, where R, L, $k_p$ and $\Delta\omega$ dominate the decay time constants, and amplitudes of the attenuation terms are primarily influenced by $C_5$, $C_6$, $C_8$ and $C_9$. The forced components are $C_7$ and $C_{10}$.

3) Third Stage of the Transient Phase: In this stage, only PLL dynamics need to be considered because both the d-axis and q-axis current controllers exit from the saturation operating state at $t_q$, i.e., $\hat{m}_\varphi = k_p(I_\varphi^*-i_\varphi)+k_i\int(I_\varphi^*-i_\varphi)dt$ in the third stage of the transient phase. Therefore, the first-order differential equations can be obtained by combing the equations (1) and (2), then, differentiating from both sides of the equations results in $$\begin{cases} \dfrac{d^2 i_d}{dt^2} + \dfrac{R+k_p}{L}\dfrac{di_d}{dt} + \dfrac{k_i}{L}i_d + \Delta\omega\dfrac{di_q}{dt} = \dfrac{k_p}{L}\dfrac{dI_d^*}{dt} + \dfrac{k_i}{L}I_d^* \\ \dfrac{d^2 i_q}{dt^2} + \dfrac{R+k_p}{L}\dfrac{di_q}{dt} + \dfrac{k_i}{L}i_q - \Delta\omega\dfrac{di_d}{dt} = \dfrac{k_p}{L}\dfrac{dI_q^*}{dt} + \dfrac{k_i}{L}I_q^* \end{cases} \quad (10)$$

The second-order differential equations in the equation (10) can be represented as follows to facilitate the derivation.

$$\begin{cases} x_1'' + A_1 x_1' + A_2 x_1 + A_3 x_2' = A_4 & (a) \\ x_2'' + A_1 x_2' + A_2 x_2 - A_3 x_1' = A_5 & (b) \end{cases} \quad (11)$$

Where $x_1$, $x_2$ denote $i_d$, $i_q$. $A_1$, $A_2$, $A_3$, $A_4$, and $A_5$ correspond to the coefficients in the equation (10).

Due to the high similarity between (11)-(a) and (11)-(b), $m_1 \cdot (a)$ can be added to $m_2 \cdot (b)$ to yield an equation (12) as follows, where $m_1$ and $m_2$ are arbitrary constants.

$$(m_1 x_1 + m_2 x_2)'' + [(A_1 m_1 - A_3 m_2)x_1 + (A_1 m_2 + A_3 m_1)x_2]' + \\ (A_2 m_1 x_1 + A_2 m_2 x_2) = A_4 m_1 + A_5 m_2 \quad (12)$$

The necessary equality constraints must be satisfied to eliminate the coupling characteristics between $x_1$ and $x_2$ in the equation (11), i.e., $m_1/m_2=(A_1 m_1 - A_3 m_2)/(A_1 m_2 + A_3 m_1) = A_2 m_1/(A_2 m_2)$. Since the current vector is $I=i_d+ji_q$, $m_1$ is set to 1 and $m_2$ can be calculated as $\pm j$, where j is the imaginary unit. By introducing new variables $y_1=x_1+jx_2$ and $y_2=x_1-jx_2$, the equation (11) can be rewritten as $$\begin{cases} y_1'' + (A_1 - jA_3)y_1' + A_2 y_1 = A_4 + jA_5 \\ y_2'' + (A_1 + jA_3)y_2' + A_2 y_2 = A_4 - jA_5 \end{cases} \quad (13)$$

The analytical results of $y_1$ and $y_2$ can be derived from the equation (13). Then, the expression of $y_1$ or $y_2$ can be further transformed into exponential functions, i.e., $e^{(\alpha+j\beta)t+(\lambda_1+j\mu_1)}$ and $e^{(\gamma+j\delta)t+(\lambda_2+j\mu_2)}$, where $\alpha=j\beta=-0.5\{A_1-jA_3+[(A_1-jA_3)^2-4A_2]^{1/2}\}$, $\lambda_1+j\mu_1=\ln z_1$, $\gamma+j\delta=-0.5\{A_1-jA_3-[(A_1-jA_3)^2-4A_2]^{1/2}\}$, and $\lambda_2+j\mu_2=\ln z_2$. $z_1$ and $z_2$ are plural coefficients derived from the initial current value and its derivative value at $t_q$. Finally, based on the linear relationship between $[x_1, x_2]^T$ and $[y_1, y_2]^T$, analytical expressions of $i_d(t)$ and $i_q(t)$ can be given in an equation (14) as $$\begin{cases} i_d(t) = e^{\alpha t+\lambda_1}\cos(\beta t + \mu_1) + e^{\gamma t+\lambda_2}\cos(\delta t + \mu_2) + C_{11} \\ i_q(t) = e^{\alpha t+\lambda_1}\sin(\beta t + \mu_1) + e^{\gamma t+\lambda_2}\sin(\delta t + \mu_2) + C_{12} \end{cases}, t \ge t_q \quad (14)$$

Where $C_{11}=A_4/A_2$ and $C_{12}=A_5/A_2$.

With the above plural domain analysis based on the linear transformation, decoupled expressions of the dq-axis fault currents in the third stage of the transient phase can be yielded. Compared with the equation (9), $i_d(t)$ and $i_q(t)$ in the equation (14) contain the damped oscillation terms again, but the decay time constants and oscillating periods are distinct from those in the equation (7).

After the attenuation terms in the equation (14) decay to 0 and $\Delta\omega$ turns into 0, the control response ultimately enters the fault steady state and fault currents fully track the LVRT current references, i.e., $i_d(t)=I_d^*$, $i_q(t)=I_q^*$, $t \ge t_s$.

Figure 3:
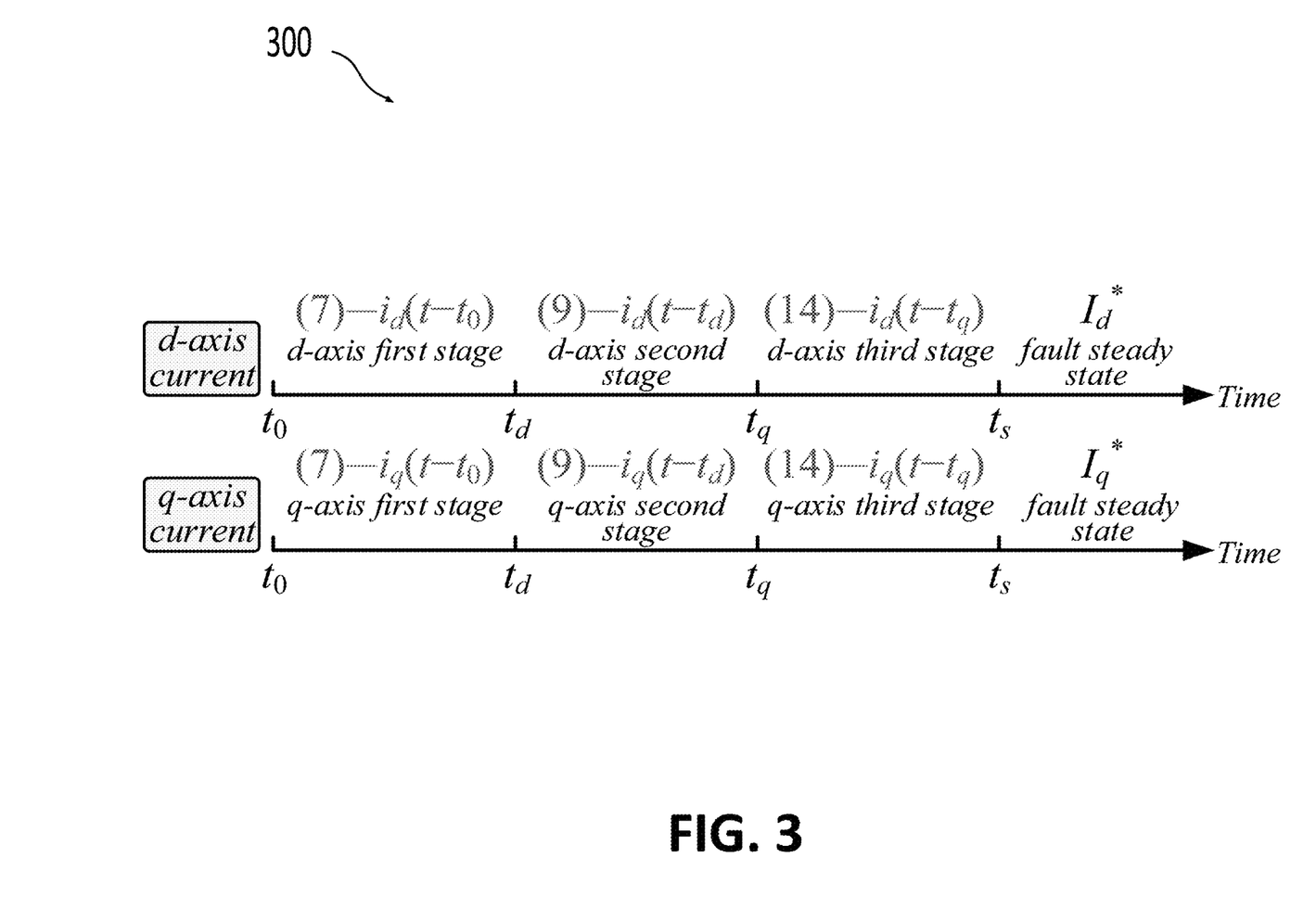
FIG. 3 shows a schematic diagram of an analytical fault model of an IIRES in different fault stages according to an embodiment of the present disclosure.

FIG. 3 shows a schematic diagram 300 of an analytical fault model of an IIRES in different fault stages according to an embodiment of the present disclosure. The description of the above analytical model of the IIRES considering DCCS can be represented by the diagram 300 in FIG. 3.

Apart from the analytical fault current expressions in each stage, the time demarcation points $t_d$ and $t_q$ in FIG. 3 also need to be clarified to determine boundaries among different stages. In accordance with definitions of $t_d$ and $t_q$, to can be derived from the boundary condition between the first stage and second stage, i.e., $m_d(t_d)=\pm M_0$. Similarly, $t_q$ can be obtained using the boundary condition between the second stage and third stage, i.e., $m_q(t_q)=\pm M_0$. In addition, switching actions in the transient phase can be ascertained by comparing mathematic relations of $|m_\varphi|$ and $M_0$, as well as $\Delta\omega$ and 0 before and after each time demarcation point.

Because of the comprehensive consideration of DCCS, the above developed model considerably expands the fault analysis theory of IIRESs compared with the prior models. Specifically, towards the fault response influenced by different factors of DCCS and their interactions, the model derived from the equation (6) to equation (14) can be used for analysis. For the case that the IIRES is merely affected by the controller saturation, the equation (6) and equation (10) can be used by eliminating terms related to $\Delta\omega$. If only the PLL dynamics need to be considered, the equation (10) to equation (14) can be directly employed. By removing the terms with $\Delta\omega$ in the equation (10), the transient response of an ideal control system can be characterized. Therefore, it can be concluded that the disclosed model is generic and practical for the fault analysis of IIRESs.

The disclosed model can also be integrated to the dynamic network as a controlled current source, and the relevant phasors in the network equations can be calculated using $i_d(t)$ and $i_q(t)$, which covers both the transient and steady-state time scales.

By applying the inverse Park transformation matrix $T_{3s/2r}$ to the disclosed model in FIG. 3, the three-phase fault currents can be obtained as $$i_\varphi(t) = \begin{cases} C_1 e^{-t/\tau_1}\cos(\theta + \Delta\omega t + \theta_\varphi) - C_2 e^{-t/\tau_1}\sin(\theta + \Delta\omega t + \theta_\varphi) + C_3\cos(\theta + \theta_\varphi) - C_4\sin(\theta + \theta_\varphi) &, t_0 \le t \le t_d \\ (C_7 + C_5 e^{-t/\tau_2} + C_6 e^{-t/\tau_3})\cos(\theta + \theta_\varphi) - (C_{10} + C_8 e^{-t/\tau_2} + C_9 e^{-t/\tau_3})\sin(\theta + \theta_\varphi) &, t_d \le t \le t_q \\ e^{\alpha t + \lambda_1}\cos(\theta + \beta t + \mu_1 + \theta_\varphi) + e^{\gamma t + \lambda_2}\cos(\theta + \delta t + \mu_2 + \theta_\varphi) + C_{11}\cos(\theta + \theta_\varphi) - C_{12}\sin(\theta + \theta_\varphi) &, t \ge t_q \end{cases} \quad (15)$$

Where $\theta = \omega\omega dt$. $\theta_a = 0$, $\theta_b = -2\pi/3$, and $\theta_c = 2\pi/3$.

Based on the equations (7), (9), (14) and (15), the amplitude of the fault current of IIRESs is considerably limited for the following two reasons. First, the amplitude of the fault current is controlled by the LVRT current references, and $(i_d^{*2}+i_q^{*2})^{1/2} \le 1.2 I_{rated}$. Second, by differentiating the equations (7), (9) and (14), it can be seen that the changing rates of $i_d(t)$ and $i_q(t)$ are different, which may make the amplitude of the fault current a smaller value than the pre-fault one under certain conditions.

Simultaneously, it can be observed from the equation (15) that the frequency characteristics of the fault current are varying in each fault stage. There are two frequency components corresponding to $\omega+\Delta\omega$ and $\omega$ in the first stage of the transient phase. However, $\omega+\Delta\omega$ is eliminated in the second stage. For the third stage, the frequency components consist of $\omega+\beta$, $\omega+\delta$ and $\omega$. Hence, the fault current of IIRESs presents frequency offset characteristics.

In accordance with the above analysis, the current limiting and frequency offset characteristics of fault responses of IIRESs are revealed from the essence using the disclosed model. These fault behaviors result in the performance deterioration of traditional protection schemes. To improve the traditional protections and design new principles of protections, analytical results of the disclosed model can be used to provide the general fault characteristics of IIRESs.

B. Discussion of the Time-Varying $\Delta\omega$

Since the PLL in FIG. 1 tracks the voltage phase with second-order dynamics after fault occurrence, there is an exponential term like $h_{1e}^{h_2 t}$ in $\omega(t)$, where $h_1$ and $h_2$ are arbitrary constants. Thus, $\Delta\omega=\omega_{com}-\omega(t)$ also presents this property, and the equations (6), (8) and (10) alter into variable coefficient differential equations, where the variable coefficient is $\Delta\omega$. Taking the third stage as an example, to eliminate the coupling characteristics of the dq-axis currents, the plural domain analysis method from the equations (11)-(13) can be similarly adopted. Then, the equation (10) can be expressed as $$y'' + p(t)y' + q_1 y = q_2 \quad (16)$$

Where the exponential term $h_{1e}^{h_2 t}$ is contained in p(t), $q_1$ and $q_2$ are plural coefficients.

For some second-order differential equations with variable coefficients, the general solution can be yielded as $$y = y_a\left[C_a + C_b \int \frac{1}{y_a^2} e^{-\int p(t)dt} dt\right] \quad (17)$$

Where $y_a$ is a specific solution of the equation (16). $C_a$ and $C_b$ are arbitrary constants.

Due to the exponential term in p(t), a transcendental integral like $\int\{e^{[-exp(t)]}\}dt$ exists in the equation (17). A common analytical method to solve this kind of equation is power-series-expansion. However, the corresponding results can hardly be expressed in analytical expressions with finite components, and thus it is difficult to apply this method to the fault analysis of IIRESs.

An alternative approximation method is used here to calculate the variable coefficient equations. Since the transient phase of the IIRES is usually within tens of milliseconds, the fault transient period $[t_0, t_s]$ can be divided into n sections with the same time interval, i.e., $[t_0, t_1]$, $[t_1, t_2]$, ..., $[t_l, t_{l+1}]$, ..., $[t_{n-1}, t_s]$, where $l=0, 1, 2, ..., n-1$. Then, the current value at the certain time $t_l$ under the time-varying $\Delta\omega$ can be approximated to that calculated using the disclosed model which is based on an assumption that $\Delta\omega$ is constant as $\omega_{com}-\omega(t_l)$. This approximation mainly depends on the PLL characteristics, i.e., $\omega(t)$ is usually a slowly varying function of time in reality because of the narrow PLL bandwidth.

IV. Simulation Verification

A 500 kW IIRES is created in PSCAD/EMTDC based on FIG. 1 for validation of the disclosed analytical model, and the parameters are provided in TABLE A. I in the Appendix.

A. Fault Current of the IIRES with Constant $\Delta\omega$

Figure 4:
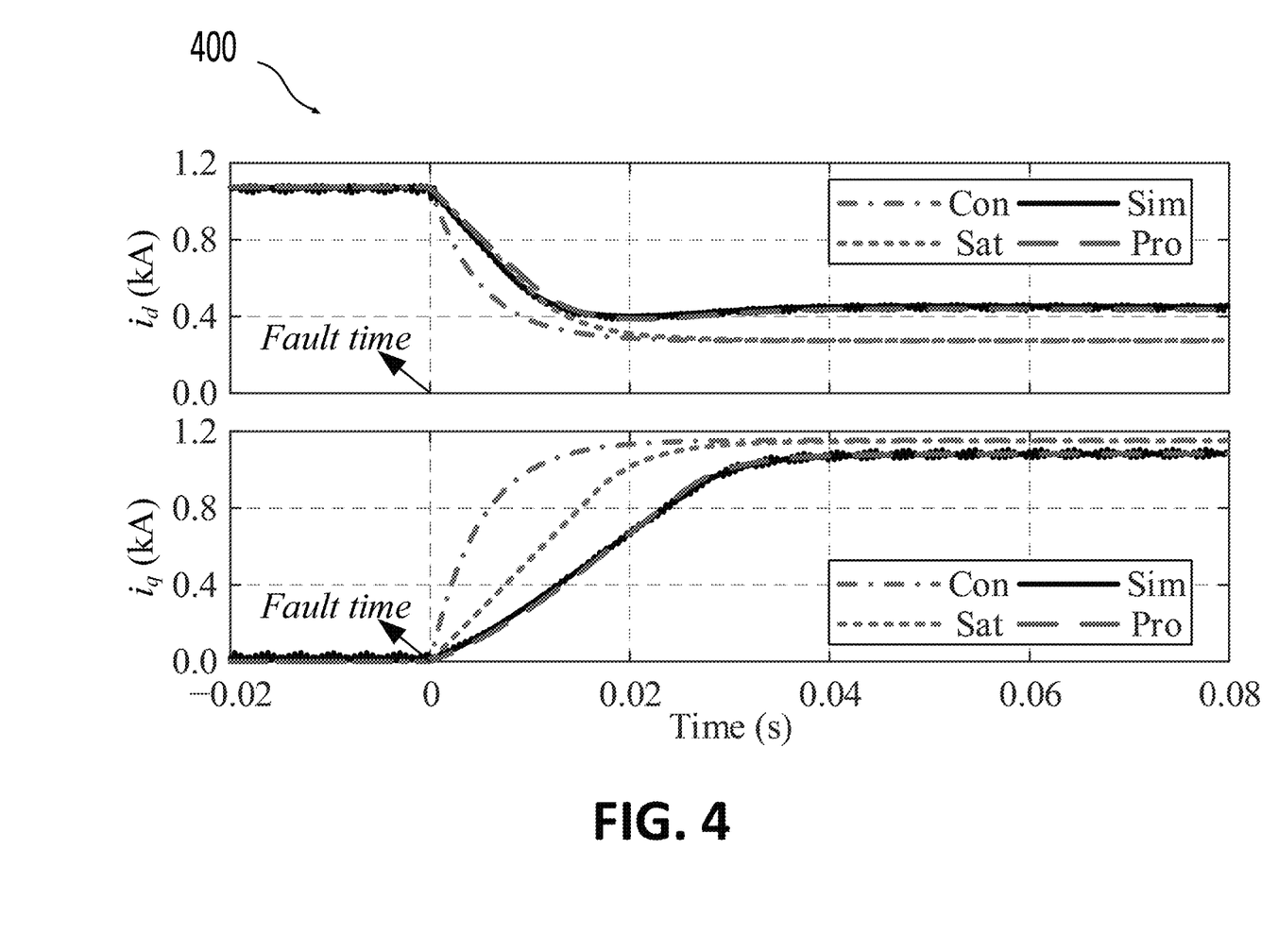
FIG. 4 shows a schematic diagram of fault current characteristics of an IIRES with constant $\Delta\omega$ in different fault stages according to an embodiment of the present disclosure.

The case in Section III A is taken as an example to verify the disclosed model. The dq-axis saturation limits are set to $\pm 0.04$ kV, $\omega_{com}$ is $[\omega(t)+\Delta\omega=\omega(t)+2\pi\times 5$ rad·s$^{-1}]$ after fault occurrence and $E^{pos}$ dips to 0.2 p.u. In this case, the LVRT current references can be calculated by the equation (3) as $I_d^* \le 0.624$ kA and $I_q^* \ge 1.129$ kA. Since the disclosed analytical model has three transient stages in this scenario, fault currents can be calculated respectively using the equations (7), (9) and (14), as shown in FIG. 3. FIG. 4 shows a schematic diagram 400 of fault current characteristics of an IIRES with constant $\Delta\omega$ in different fault stages according to an embodiment of the present disclosure. For comparison of the calculation accuracy, the calculation results obtained from the existing models (labeled as "Con" and "Sat") are plotted in FIG. 4 with the simulation currents (labeled as "Sim") and calculation results of the disclosed model (labeled as "Pro").

It can be observed from FIG. 4 that because of PLL dynamics, the fault current presents damping oscillations and the transition process is prolonged. The controller saturation further prolongs the transient response, slowing the tracking speed of the dq-axis currents to the LVRT current references. Because the controller saturation and PLL dynamics are covered in the disclosed analytical model, the calculated currents of the disclosed model coincide well with the simulation results. However, since DCCS are not fully considered in the existing models, the relevant results ("Con" and "Sat" in FIG. 4) can hardly reflect the detailed variation law of the simulation currents.

Figure 5:
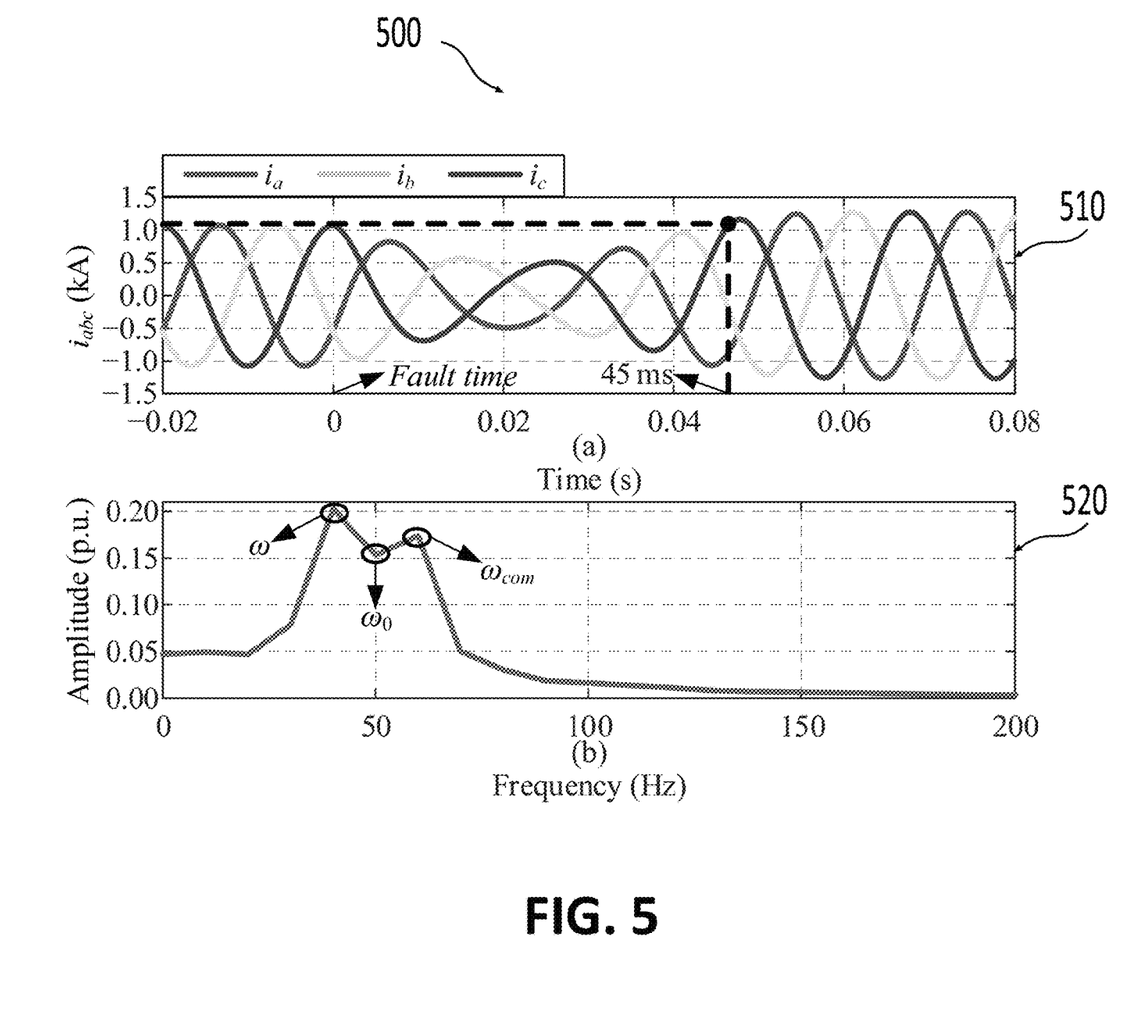
FIG. 5 shows a schematic diagram of three-phase current characteristics of IIRESs according to an embodiment of the present disclosure.

FIG. 5 shows a schematic diagram 500 of three-phase current characteristics of IIRESs according to an embodiment of the present disclosure. In FIG. 5, the diagram 500 includes a graph 510 of phase current and a graph 520 of frequency spectrum (phase-A current). As shown, the three-phase fault currents calculated using the disclosed model are presented in the graph 510. Influenced by the controller saturation and PLL dynamics, the amplitude of the fault currents decreases in the first 20 ms after fault occurrence, and reaches the pre-fault value until 45 ms. Thus, the current limiting and transient response prolonging characteristics are significant under impacts of DCCS. The graph 520 shows the frequency characteristics extracted from the graph 510, and the data window is from −0.02 s to 0.08 s. It can be seen that apart from the power frequency component ωo, there are another two frequency components corresponding to $\omega$ and $\omega_{com}$, which verifies the frequency offset characteristics caused by DCCS.

B. Fault Current of the IIRES with Time-Varying $\Delta\omega$

Figure 6:
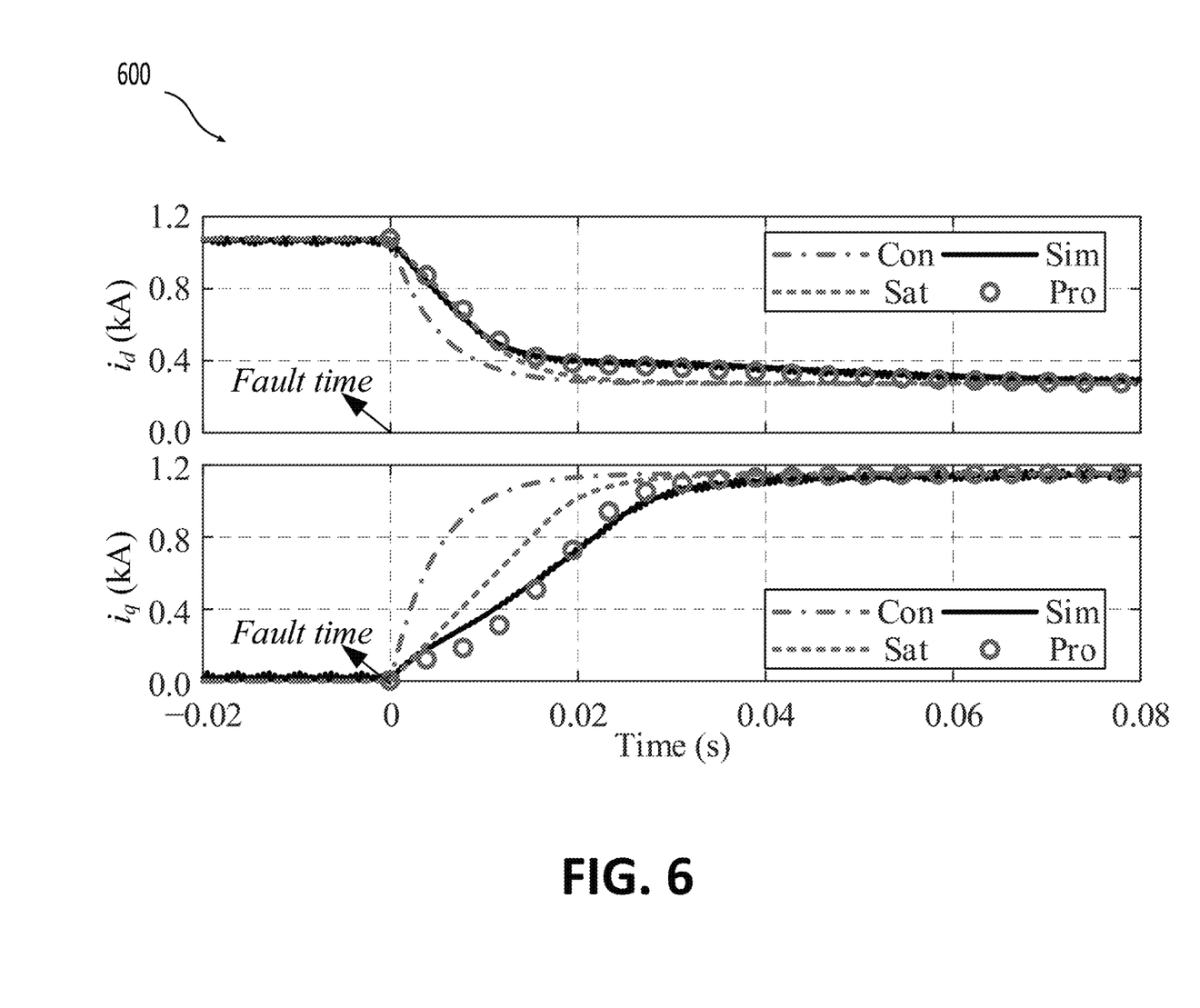
FIG. 6 shows a schematic diagram of fault current characteristics of IIRES with time-varying $\Delta\omega$ according to an embodiment of the present disclosure.

With regard to the parameters typically used in the actual control system, the feedforward compensation term is set to $\omega_{com}L=\omega_0L$, and thus $\Delta\omega$ presents time-varying characteristics after fault occurrence. On basis of Section III B, the fault period [0, 80 ms] can be divided into 20 intervals, i.e., [0, 4 ms], [4 ms, 8 ms], . . . , [76 ms, 80 ms]. The discrete fault current values are calculated at the beginning of each time interval using the approximation method disclosed in Section III B. FIG. 6 shows a schematic diagram 600 of fault current characteristics of IIRES with time-varying $\Delta\omega$ according to an embodiment of the present disclosure. As shown in FIG. 6, the comparison of the calculation and simulation results is illustrated. It can be seen that the calculated currents of the disclosed method are almost coincident with the simulation results.

Since $\Delta\omega$ is time-varying in this scenario, $\Delta\omega$ reduces to 0 at about 60 ms after fault occurrence. By then, the dq-axis currents are no longer coupled and the IIRES enters the fault steady state. However, if $\Delta\omega$ is a nonzero constant in the transient phase, influences of PLL dynamics on fault currents can hardly diminish in different transient stages. Therefore, the transient phase of the simulation current in FIG. 6 is distinctly shortened compared with FIG. 4.

C. Verification of the Disclosed Model in Different Scenarios

The disclosed analytical model is further verified in various fault scenarios (with time-varying $\Delta w$), including different fault resistances, fault types, controller parameters and saturation limits. The default parameters remain the same as those in Section IV B. The average calculation errors of the q-axis fault current in 0-40 ms are selected to compare the calculation and simulation results. The instantaneous fault current error can be calculated using $\sigma_k=|i_{Sim}(k)-i_{Cal}(k)|/|I_{max}|$, where k is the specific moment, $i_{Sim}$ and $i_{Cal}$ are the simulation and calculation current values. The average calculation error of the fault current can be derived from the arithmetical mean of $\sigma_k$.

To demonstrate the calculation accuracy of the disclosed model, the prior typical analytical models of IIRESs are used as comparisons to calculate the average errors of the fault currents (labeled as "Con"). The error comparisons are shown in TABLE I-TABLE III.

TABLE I

AVERAGE CURRENT ERRORS OF DIFFERENT FAULT CONDITIONS

| Fault type | $E^{pos}$ (p.u.) | Con (%) | Pro (%) |
|---|---|---|---|
| ABC | 0.2 | 29.08 | 5.96 |
| | 0.4 | 26.86 | 4.54 |
| | 0.6 | 24.44 | 3.33 |
| | 0.8 | 21.72 | 2.30 |
| AB/BC/CA | 0.6 | 14.99 | 3.19 |
| | 0.7 | 16.18 | 2.99 |
| | 0.8 | 16.96 | 2.95 |
| ABG/BCG/CAG | 0.6 | 18.09 | 4.26 |
| | 0.7 | 18.62 | 4.24 |
| | 0.8 | 18.68 | 3.92 |
| AG/BG/CG | 0.7 | 15.80 | 1.76 |
| | 0.8 | 16.64 | 2.18 |

TABLE II

AVERAGE CURRENT ERRORS OF DIFFERENT CONTROLLER PARAMETERS

| Parameter | Value (Hz) | Con (%) | Pro (%) |
|---|---|---|---|
| Bandwidth of the current controller | 25 | 24.55 | 4.83 |
| | 50 | 30.20 | 4.31 |
| | 100 | 34.60 | 5.35 |
| | 150 | 35.79 | 5.16 |
| | 200 | 35.49 | 4.08 |
| Bandwidth of the PLL controller | 5 | 18.64 | 1.41 |
| | 10 | 20.96 | 2.11 |
| | 15 | 23.39 | 2.94 |
| | 20 | 25.92 | 4.21 |
| | 25 | 28.26 | 5.51 |

TABLE III

AVERAGE CURRENT ERRORS OF DIFFERENT SATURATION LIMITS

| Parameter | $M_0$ (kV) | Con (%) | Pro (%) |
|---|---|---|---|
| Saturation limit | 0.02 | 66.44 | 6.95 |
| | 0.04 | 26.86 | 4.54 |
| | 0.06 | 13.82 | 3.10 |
| | 0.08 | 9.18 | 2.60 |
| | 0.10 | 7.13 | 2.30 |
| | ∞ | 5.36 | 2.25 |

From TABLE I, the first set of subcases is to study the calculation current errors for different voltage sags (3-phase fault), and the fault resistance is the only variable. For a large fault resistance, the voltage sag is relatively low. In this case, the PLL only perceives a small disturbance, hence, $\Delta\omega\approx 0$, and fault currents are mainly influenced by the controller saturation. It can be seen that the disclosed model presents a high calculation accuracy under different voltage sags.

For asymmetric fault conditions, three different fault types are selected, as presented in TABLE I. Due to the feedforward compensation of the terminal voltage as shown in FIG. 1, fault currents of the IIRES remain balanced even under unbalanced faults. Therefore, average current errors calculated using the disclosed method under asymmetric faults are close to those in the first set of subcases with the same voltage sags.

Similarly, simulations of different controller bandwidths are conducted. The transient response of the IIRES accelerates with the increase of bandwidth of the current controller (normally less than 200 Hz), resulting in more significant impacts of DCCS. Current errors of the existing analytical models increase with a higher bandwidth of the current controller, while those of the disclosed model remain stable.

PLL dynamics vary with different bandwidths of the PLL controller (normally less than 25 Hz). With the increase of the PLL bandwidth, the response speed of the phase-locked system is facilitated, and thus PLL dynamics are intensified. As a result, it can be seen from TABLE II that current errors of the disclosed model slightly increase, but errors of the disclosed method are remarkably less than those of the existing methods.

TABLE III shows the error results with different saturation limits. A smaller $M_0$ generates a stronger damping oscillation caused by PLL dynamics as shown in the equations (6) and (8), resulting in a more deteriorated calculation accuracy of the existing analytical models. Compared with the existing methods, the calculation accuracy is significantly enhanced using the disclosed model. Therefore, the disclosed method is insensitive to variations of the saturation limit.

Since the disclosed model introduces approximation into the fault analysis of IIRESs, there are inevitable errors included in the calculation results. It can be seen from TABLE I-TABLE III that the maximum error maintains within 10%. Thus, the disclosed method can provide an accurate analytical fault analysis model of IIRESs for the design principle of protection.

D. Comparison Between the Disclosed Analytical Model and the Existing Methods

To illustrate the superiority of the disclosed model, a brief summary of the comparison between the disclosed model and existing fault models of IIRESs is listed in TABLE IV. In accordance with TABLE IV, the disclosed model presents the following advantages: 1) this model can give analytical mechanism cognition of fault behaviors of IIRESs, which is more applicable for fault analysis and protection design; 2) the disclosed model covers factors of the LVRT control strategy, controller saturation and PLL dynamics, ensuring the universality of the analytical results; and 3) the disclosed model characterizes the detailed transient process of IIRESs, and thus it can accurately calculate fault responses under impacts of DCCS.

TABLE IV

COMPARISON BETWEEN THE DISCLOSED MODEL WITH EXISTING FAULT MODELS OF IIRESS

| Reports | Provide analytical model | Support transient analysis | Consider controller saturation | Consider PLL dynamics | Consider interactions of different factors of DCCS |
|---|---|---|---|---|---|
| Existing1 | Not | Yes | Yes | Yes | Yes |
| Existing2 | Yes | Not | Not | Not | Not |
| Existing3 | Yes | Yes | Not | Not | Not |
| Existing4 | Yes | Yes | Not | Not | Not |
| Existing5 | Yes | Yes | Yes | Not | Not |
| Disclosed | Yes | Yes | Yes | Yes | Yes |

V. Field Test

Figure 7:
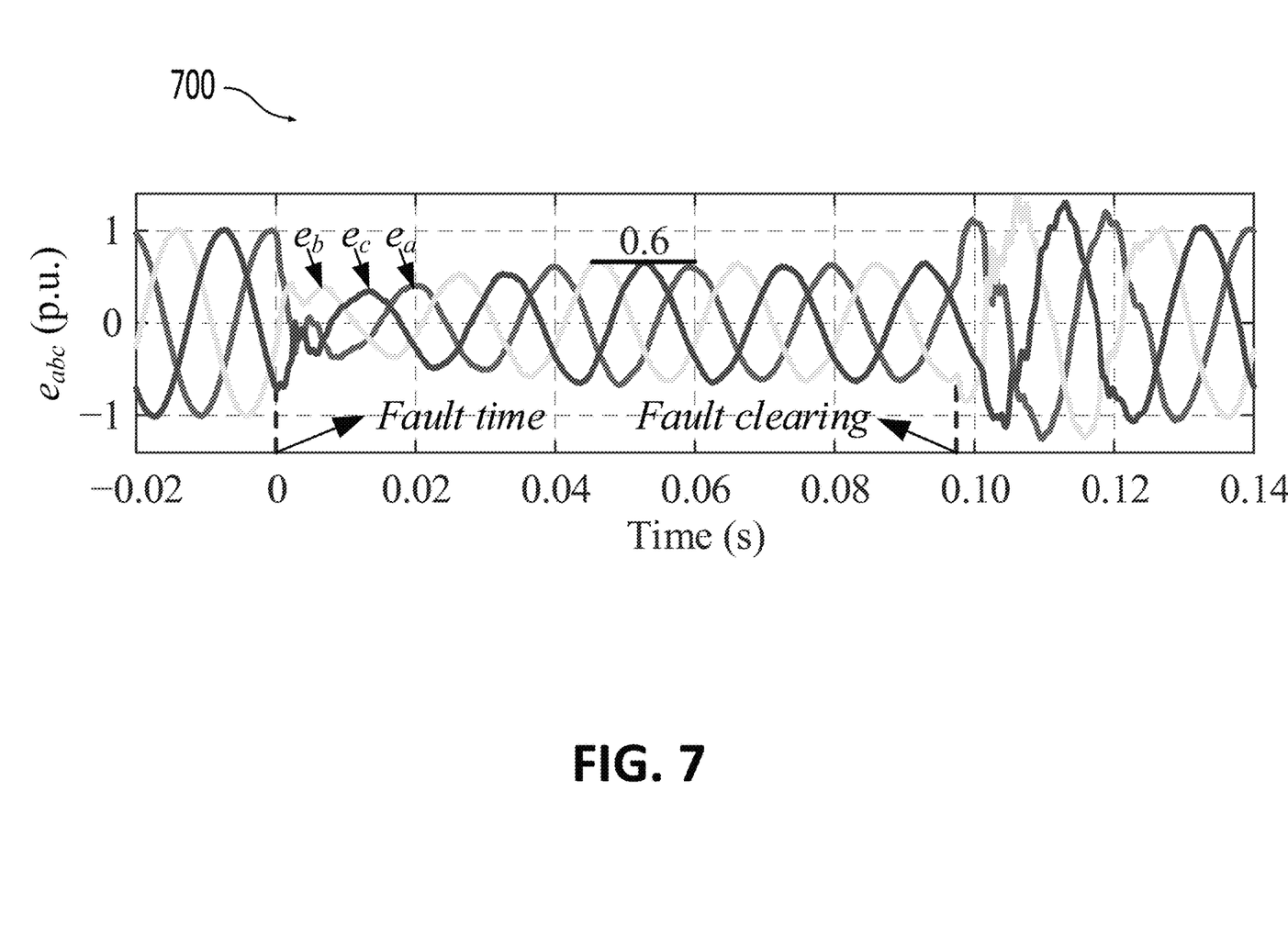
FIG. 7 shows a schematic diagram of recorded terminal voltage of a measured permanent magnet synchronous generator (PMSG) according to an embodiment of the present disclosure.

The field recorded data obtained from a permanent magnet synchronous generator (PMSG) under a 3-phase grid fault are applied to verify the disclosed model. This PMSG is located in a realistic larger-scale network and its parameters are specified in TABLE A II in the Appendix. FIG. 7 shows a schematic diagram 700 of recorded terminal voltage of the measured PMSG according to an embodiment of the present disclosure. The recorded terminal voltage of the measured PMSG is presented in FIG. 7.

First, the recorded voltage data are used to calculate the LVRT current references using the equation (3) and extracted to obtain the corresponding angular frequency data. Then, based on the LVRT current references, angular frequency of the recorded voltage and given parameters of the PMSG, the dq-axis fault currents can be calculated using the disclosed model established in Section III, and the time interval is set to 2 ms. Finally, on basis of the phase data detected from the recorded terminal voltage, the calculation phase currents can be yielded.

Figure 8:
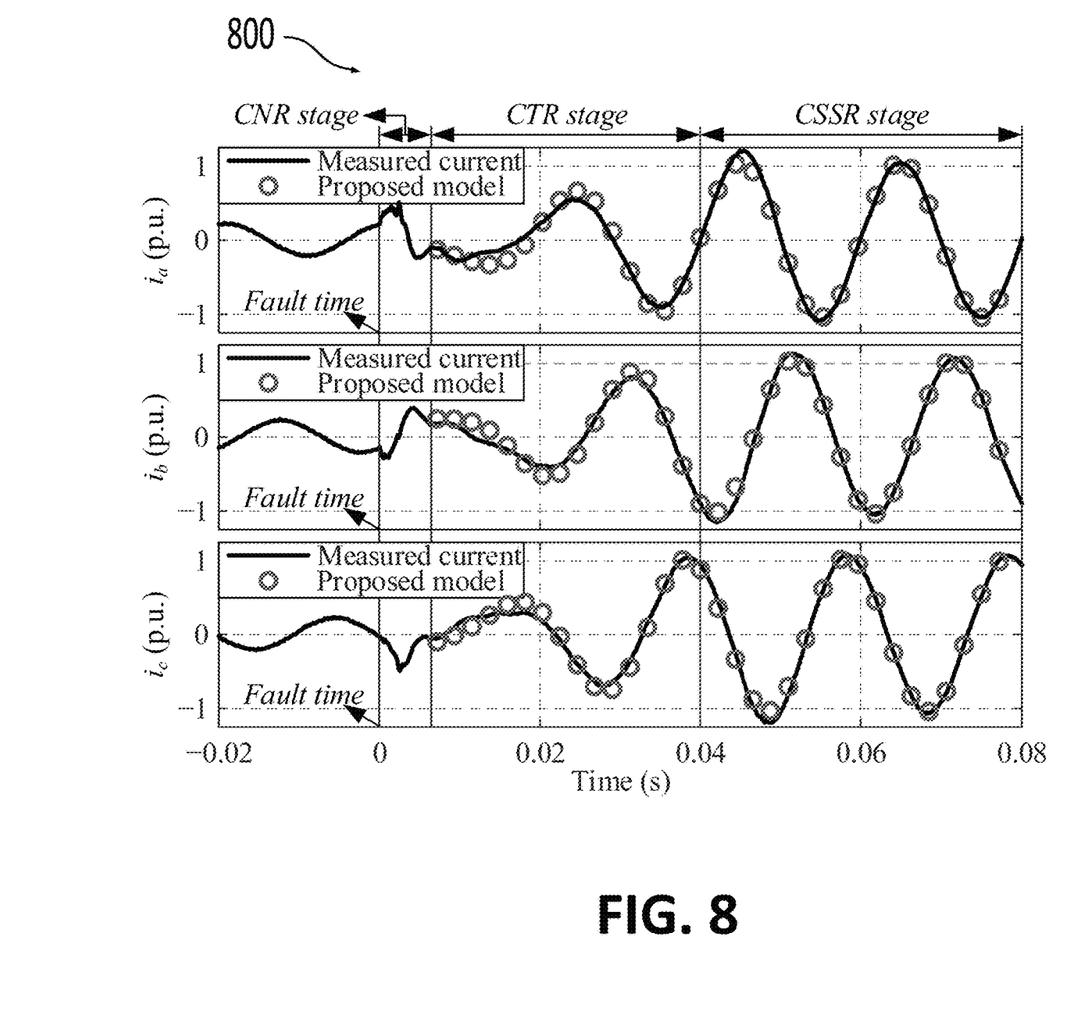
FIG. 8 shows a schematic diagram of comparison results between recorded and calculation fault currents according to an embodiment of the present disclosure.

FIG. 8 shows a schematic diagram 800 of comparison results between recorded and calculation fault currents according to an embodiment of the present disclosure. Comparisons between the measured and calculation phase current results are presented in FIG. 8 (the measured PMSG is not fully utilized in the pre-fault steady state). Due to the strong couplings between fault characteristics and control responses of IIRESs, fault currents of the PMSG show notably staged characteristics, as presented in FIG. 8.

In accordance with different control loops of IIRESs, fault responses of the PMSG can be divided into three fault stages, corresponding to the control non-response stage, labeled as CNR stage in FIG. 8, control transient response stage (labeled as CTR stage) and control steady-state response stage (labeled as CSSR stage). The formation of CNR stage is normally caused by uncontrollable factors in the actual fields such as the control delay, fault detection time and fault time error, and the CNR stage may last for 0-5 ms. Then, the control system switches to the fault control mode and the fault current begins to track the LVRT current references in the CTR stage. The duration of this transition process is about 40 ms. In respect to the CSSR stage, fault responses of the IIRES in this stage differ with different LVRT control strategies. Thereinto, the amplitude of the fault steady-state current is usually limited to $1.2\text{-}1.5 I_{rated}$.

Since the present disclosure concentrates on the influence of DCCS on the fault current characteristics of IIRESs, the studied time-scale is included in the fault period when the LVRT control starts to respond. Thus, the first to third stages of the transient phase in Section III belong to the above CTR stage, and the disclosed model is mainly validated in the CTR stage and CSSR stage after the CNR stage. It can be observed from FIG. 8 that the calculation results are almost coincident with the measured currents, verifying the effectiveness of the disclosed model for the fault analysis of IIRESs in practice.

VI. Conclusion

An analytical fault analysis model of IIRESs that considers DCCS is disclosed in the present disclosure. Based on this disclosed model, complex impacts of the control response on the fault characteristics of IIRESs are comprehensively studied. Therefore, fault responses covering different fault phases can be analytically revealed. Specifically, the controller saturation and PLL dynamics are the crucial elements resulting in the nonlinear transient responses of IIRESs. The saturation elements introduce the piecewise and time delay characteristics into the transient phase. Meanwhile, the dynamic features of PLL cause coupling effects of the dq-axis fault currents, which further aggravates the time delay elements in the transient response. Apart from being applicable to variant fault scenarios, the calculation accuracy of the disclosed model can be improved by at most 55% compared with other analytical models when considering DCCS. Due to the intuitive and accurate analytical formulas, the disclosed model can provide an analytical basis for the fault analysis of IIRESs, which is necessary for the protection algorithm. In terms of the practical use of the disclosed model, fault currents determined from the disclosed model can be exploited to evaluate the effectiveness of the traditional power frequency line protection. On this basis, key factors attributed to the performance degradation of the traditional protection can be revealed using the disclosed model. Then, relevant control loops of IIRESs can be properly designed considering these factors to improve the performance of the traditional protection (e.g., the power frequency line protection).

VII. Technical Implementation of the Disclosed Method

Figure 9:
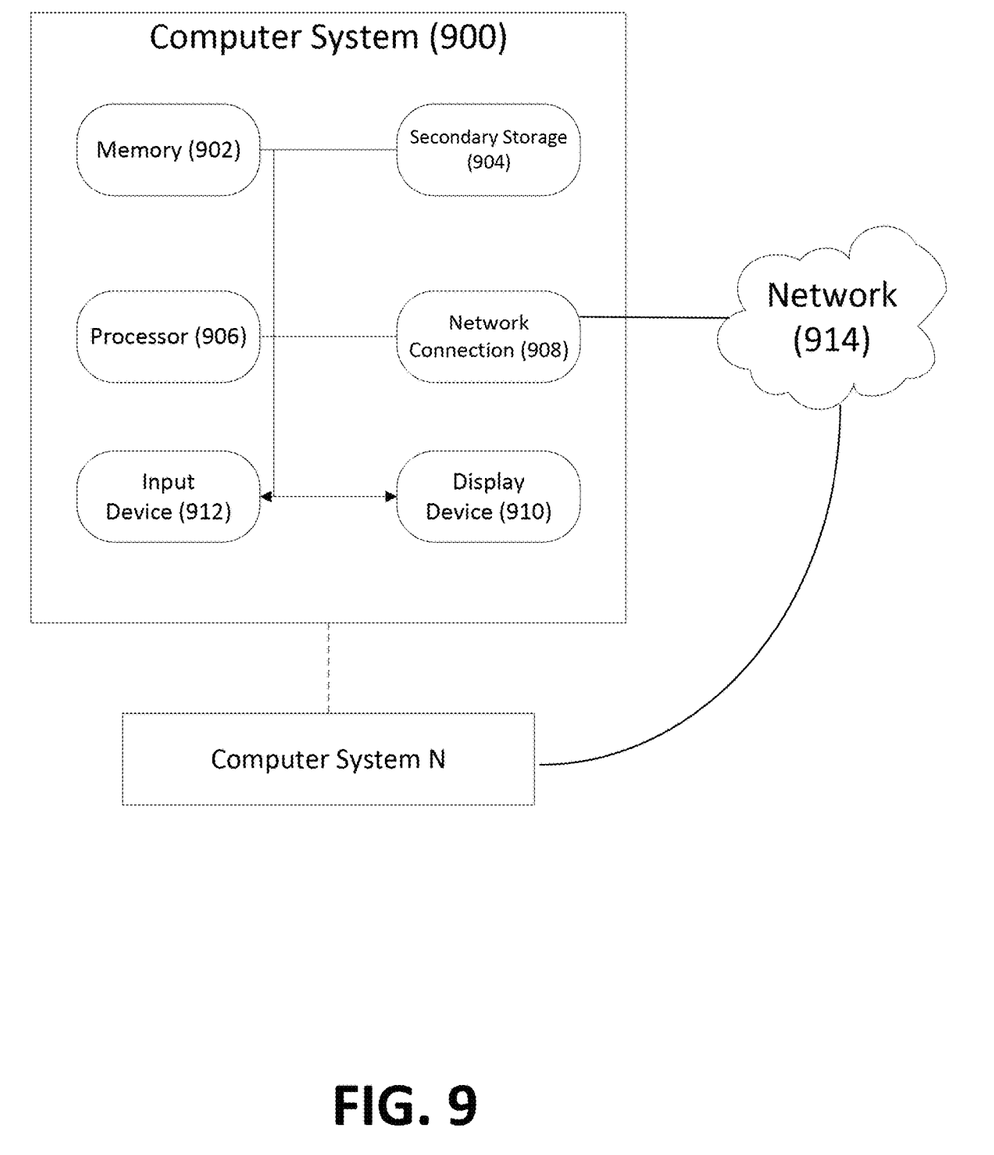
FIG. 9 shows illustrates an exemplary computer system that can be used to implement the disclosed method partially or wholly, according to an embodiment of the present disclosure.

In some embodiments, the system disclosed herein may comprise a computer system to implement the disclosed method. FIG. 9 illustrates an exemplary computer system 900 that can be used to implement the disclosed method partially or wholly. The computer system 900, or other computer systems similarly configured, may include and execute one or more subsystem components to perform functions described herein, including the steps/blocks of various processes, measurements and/or analyses described above. Likewise, a mobile device, a cell phone, a smartphone, a laptop, a desktop, a notebook, a tablet, a wearable device, a server, etc., which includes some of the same components of the computer system 900, may run an application (or software) and perform the steps and functionalities described above. The computer system 900 may connect to a network 914, e.g., Internet, or other network, to receive inquiries, obtain data, and/or transmit information as described above.

The computer system 900 typically includes a memory 902, a secondary storage device 904, and a processor 906. The computer system 900 may also include a plurality of processors 906 and be configured as a plurality of, e.g., bladed servers, or other known server configurations. The computer system 900 may also include a network connection device 908, a display device 910, and an input device 912.

The memory 902 may include RAM or similar types of memory, and it may store one or more applications for execution by the processor 906. The secondary storage device 904 may include a hard disk drive, floppy disk drive, CD-ROM drive, or other types of non-volatile data storage. The processor 906 executes the application(s), such as those described herein, which are stored in the memory 902 or secondary storage 904, or received from the Internet or other network 914. The processing by processor 906 may be implemented in software, such as software modules, for execution by computers or other machines. These applications preferably include instructions executable to perform the system and subsystem component functions and methods described above and illustrated in the Figs. herein. The applications preferably provide graphical user interfaces (GUIs) through which users may view and interact with the subsystem components.

The computer system 900 may store one or more database structures in the secondary storage 904, for example, for storing and maintaining the information/data necessary to perform the above-described functions. Alternatively, such information/data may be in storage devices separate from these components.

Also, as noted, the processor 906 may execute one or more software applications to provide the functions described in this specification, specifically to execute and perform the steps and functions in the process flows, measurements and/or analyses described above. The GUIs may be formatted, for example, as web pages in HyperText Markup Language (HTML), Extensible Markup Language (XML) or in any other suitable form for presentation on a display device depending upon applications used by users to interact with the computer system 900.

The input device 912 may include any device for entering information into the computer system 900, such as a touch-screen, keyboard, mouse, cursor-control device, microphone, digital camera, video recorder or camcorder. The input and output device 912 may be used to enter information into GUIs during performance of the methods described above. The display device 910 may include any type of device for presenting visual information such as, for example, a computer monitor or flat-screen display (or mobile device screen). The display device 910 may display the GUIs and/or output from sub-system components (or software).

Examples of the computer system 900 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 900 is shown in detail, the computer system 900 may use multiple computer systems or servers as necessary or desired to support the users and may also use back-up or redundant servers to prevent network downtime in the event of a failure of a particular server. In addition, although the computer system 900 is depicted with various components, one skilled in the art will appreciate that the computer system 900 can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 900, to perform a particular method, such as methods described above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

APPENDIX

TABLE A I

PARAMETERS OF THE TEST SYSTEM IN SIMULATION

| Type | Parameters | Value |
|---|---|---|
| Inverter | Rated voltage | 0.38 kV |
| | Rated power | 500 kW |
| | Voltage of DC source | 1 kV |
| | DC capacitor | 7800 μF |
| | Proportional gain of current loop | 0.15 |
| | Integral gain of current loop | 0.16 |
| | Proportional gain of PLL | 50 |
| | Integral gain of PLL | 900 |
| | Carrier frequency | 5000 Hz |
| LCL filter | Total inductance | 0.75 mH |
| | Total resistance | 0.2 mΩ |
| | Capacitance | 50 μF |
| Transformer | Ratio | 0.38/10 kV |
| | Leakage reactance | 0.01 p.u. |
| AC grid | Grid voltage | 10 kV |
| | Grid inductance | 8 mH |

TABLE A II

PARAMETERS OF THE MEASURED PMSG

| Type | Parameters | Value |
|---|---|---|
| Inverter | Rated voltage | 0.69 kV |
| | Rated power | 1500 kW |
| | Proportional gain of current loop | 0.2 |
| | Integral gain of current loop | 0.0533 |
| | Saturation limit | 0.03 kV |
| | Sampling frequency | 6400 Hz |
| Power filter | Total inductance | 0.75 mH |
| | Total resistance | 0.2 mΩ |

What is claimed is:

1. A method for protecting a power system having inverter-interfaced renewable energy sources (IIRESs), wherein the power system includes an inverter, an inductor-capacitor-inductor (LCL) limiter, a control system, and at least one renewable energy source; and the control system includes a current controller including a saturation limiter and a proportional and integral (PI) controller, a phase-locked system, and a low-voltage ride-through (LVRT) control unit, the method comprising:

by using a Park transformation matrix $T_{2r/3s}$, determining an output voltage u of the inverter in a dq-coordinate system, as $$\begin{cases} u_d = -L\dfrac{di_d}{dt} - Ri_d + \omega L i_q + e_d \\ u_q = -L\dfrac{di_q}{dt} - Ri_q - \omega L i_d + e_q \end{cases} \quad (1)$$

wherein:
the $\omega$ is an angular frequency detected by a phase-locked loop (PLL) of the phase-locked system in a synchronous reference frame (SRF), $u_\varphi$ is an inverter output voltage, $e_\varphi$ is a terminal voltage, and $i_\varphi$ is a grid current;
$\varphi \in \{d, q\}$ indicates variables in a synchronous reference frame, and R and L are a total resistance and inductance of the power filter;
determining a modulated voltage u* of the output voltage u of the inverter in the dq-coordinate system, as $$\begin{cases} u_d^* = -\hat{m}_d + \omega_{com} L i_q + e_d \\ u_q^* = -\hat{m}_q - \omega_{com} L i_d + e_q \end{cases} \quad (2)$$

wherein:
the $\hat{m}_\varphi$ is an output of the saturation limiter of the current controller, $\omega_{com}$ is an angular frequency of the compensation link of the current controller, and $u_\varphi^*$ is a modulated voltage;
upon detecting a grid fault, obtaining current references I* in the dq-coordinate system by the LVRT control unit, as $$\begin{cases} I_d^* \leq \min\left\{\sqrt{I_{max}^2 - I_q^{*2}},\ \dfrac{2P_0}{3e_d} I_{rated}\right\} \\ I_d^* \geq 1.5(0.9 - E^{pos}) I_{rated} \end{cases} \quad (3)$$

wherein:
the $I_\varphi^*$ is a current reference value of a current controller, $I_{max}$ is a maximal value of the fault current, $P_0$ is a pre-fault active power of the inverter, $E^{pos}$ is a per-unit value of the positive sequence component of the terminal voltage; and
$I_{max} = 1.2 I_{rated}$ such that $I_{rated}$ indicates the rated current;
determining the $\hat{m}_\varphi$ which is the output of the saturation limiter of the current controller, as $$\hat{m}_\varphi(t) = \begin{cases} k_p(I_\varphi^* - i_\varphi) + k_i \int (I_\varphi^* - i_\varphi) dt &, |m_\varphi| < M_0 \\ +M_0 \text{ or } -M_0 &, |m_\varphi| \geq M_0 \end{cases} \quad (4)$$

wherein the $k_p$ and $k_i$ are a proportional gain and an integral gain of a current controller, $M_0$ is a saturation limit of a saturation limiter of the current controller, and $m_\varphi$ is an input of the saturation limiter of the current controller;

determining the $\omega$ in a time domain which is the angular frequency detected by the SRF-PLL, as $$\omega(t) = \omega_0 + \Delta\theta\left[-\dfrac{\rho_1^2}{2\lambda} e^{-\rho_1 t} + \dfrac{\rho_2^2}{2\lambda} e^{-\rho_2 t}\right]; \quad (5)$$

wherein the $\Delta\theta$ is a phase jump value of the terminal voltage, $\omega_0$ is a power angular frequency, and constant coefficients $\lambda$, $\rho_1$ and $\rho_2$ are determined by PI parameters of a PLL and a terminal voltage;
determining, by combing the (1), (2) and (5), a fault current in a first stage of a transient phase of the grid fault, as $$\begin{cases} i_d(t) = C_1 e^{-\frac{1}{\tau_1}t} \cos(\Delta\omega t) - C_2 e^{-\frac{1}{\tau_1}t} \sin(\Delta\omega t) + C_3 \\ i_q(t) = C_1 e^{-\frac{1}{\tau_1}t} \sin(\Delta\omega t) + C_2 e^{-\frac{1}{\tau_1}t} \cos(\Delta\omega t) + C_4 \end{cases}, t_0 \leq t \leq t_d; \quad (7)$$

wherein the $C_1$-$C_4$ are constant coefficients derived from initial current values and relevant derivative values at a fault time $t_0$, $C_3$ and $C_4$ are related to variant factors: $M_0$, R, L, and $\Delta\omega = \omega_{com} - \omega(t)$, an attenuation time constant $\tau_1$ satisfies $1/\tau_1 = R/L$, and $t_d$ is an end time of a first stage of a transient phase of a grid fault;
determining, by combing the (1), (2) and (5), a fault current in a second stage of the transient phase of the grid fault, as $$\begin{cases} i_d(t) = C_5 e^{-\frac{1}{\tau_2}t} + C_6 e^{-\frac{1}{\tau_3}t} + C_7 \\ i_q(t) = C_8 e^{-\frac{1}{\tau_2}t} + C_9 e^{-\frac{1}{\tau_3}t} + C_{10} \end{cases}, t_d \leq t \leq t_q; \quad (9)$$

wherein the $C_5$-$C_{10}$ are constant coefficients derived from a q-axis current and its derivatives at moment $t_d$, attenuation time constants $\tau_2$ and $\tau_3$ satisfy $1/\tau_2 = \{2R + k_p + [k_p^2 - (2\Delta\omega L)^2]^{1/2}\}/(2L)$ and $1/\tau_3 = \{2R + k_p - [k_p^2 - (2\Delta\omega L)^2]^{1/2}\}/(2L)$, and $t_q$ is an end time of a second stage of a transient phase of the grid fault;
determining, by combing the (1), (2) and (5), a fault current in a third stage of the transient phase of the grid fault, as $$\begin{cases} i_d(t) = e^{\alpha t + \lambda_1} \cos(\beta t + \mu_1) + e^{\gamma t + \lambda_2} \cos(\delta t + \mu_2) + C_{11} \\ i_q(t) = e^{\alpha t + \lambda_1} \sin(\beta t + \mu_1) + e^{\gamma t + \lambda_2} \sin(\delta t + \mu_2) + C_{12} \end{cases}, t \geq t_q; \quad (14)$$

wherein $\alpha$, $\gamma$, $\lambda_1$, $\lambda_2$, $\beta$, $\delta$, $\mu_1$, $\mu_2$, $C_{11}$, and $C_{12}$ are constant coefficients and related to variant factors: R, L, $k_p$, $k_i$, $\Delta\omega$, $I_d^*$ and $I_q^*$;
switching the control system to a fault control mode by tracking the fault currents in the first stage, second stage and third stage of the transient phase of the grid fault, to the current references obtained by LVRT unit; and
evaluating an effectiveness of a power frequency line protection of the power system, and designing control loops of the IIRESs to improve performance of power frequency line protection.

* * * * *